April 8, 1930.　　　W. D. BURNS　　　1,753,691
ROLLER BEARING
Filed June 30, 1927　　　2 Sheets-Sheet 1
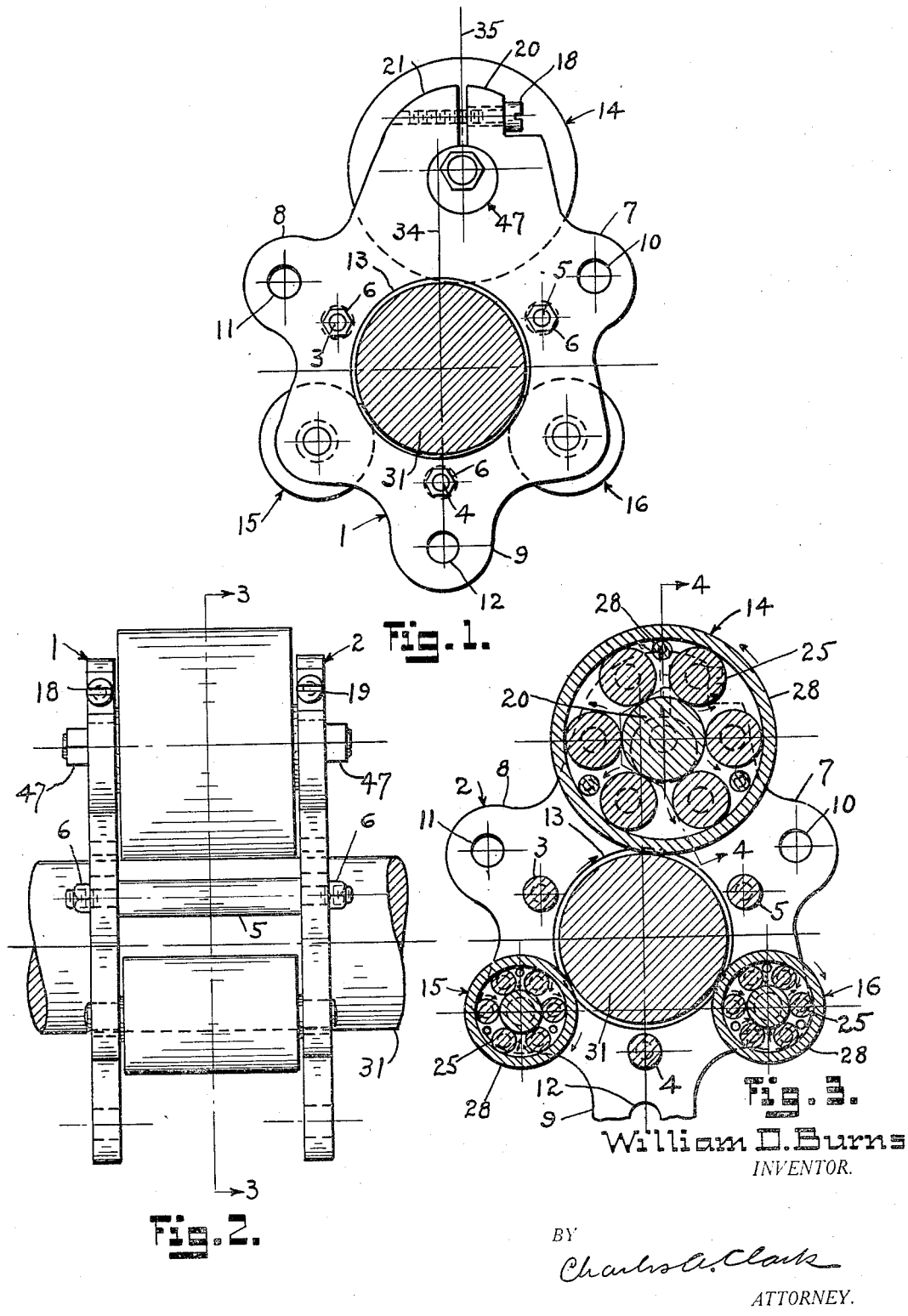
William D. Burns
INVENTOR.
BY
Charles A. Clark
ATTORNEY.

April 8, 1930.　　　　W. D. BURNS　　　　1,753,691

ROLLER BEARING

Filed June 30, 1927　　　2 Sheets-Sheet 2

William D. Burns
INVENTOR.

BY Charles A. Clark
ATTORNEY.

Patented Apr. 8, 1930

1,753,691

UNITED STATES PATENT OFFICE

WILLIAM D. BURNS, OF AMENIA, NEW YORK

ROLLER BEARING

Application filed June 30, 1927. Serial No. 202,849.

My invention relates to roller bearings but more particularly refers to roller bearings as utilized in vehicles.

One object of my invention is to provide a bearing wherein the load carrying unit is offset from the vertical centerline of the bearing.

Another object of my invention is to provide a three point bearing wherein the moving elements revolve with the minimum of friction.

A still further object of my invention is to provide a bearing having three revoluble units therein, one of which carries the load and the other two act as positioning or guide units.

I am aware that roller bearings of various types and classes have been employed but none contemplate the unique combination of novel elements utilized in producing the remarkable results produced by this particular device.

With these and other objects in view, my invention consists of the novel construction, arrangement of parts and combination of elements, hereinafter referred to, described, claimed and substantially as illustrated in the accompanying drawings, wherein similar numerals refer to like parts throughout the several views, in which:—

Figure 1, is an end elevation of the bearing.

Figure 2, is a side elevation of the bearing.

Figure 3, is a cross section taken on lines 3—3 of Figure 2.

Figure 4:
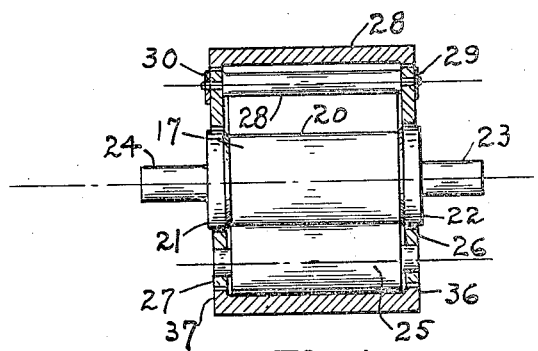
Figure 4, is a longitudinal section of the load carrying unit.

The bearing comprises two end frames 1 and 2, spaced apart by the shouldered bolts 3, 4 and 5, each provided with nuts 6, between which are held two fixed rollers and one adjustable roller.

Each of these end frames has three lugs 7, 8 and 9, with bolt holes 10, 11 and 12, provided for bolting the bearing to a supporting means, not shown.

Each end frame also has a clearance hole 13, through which the shaft 31, may pass, which shaft engages three roller bearing units 14, 15 and 16.

Referring to Figure 4, the body 17, of 15 and 16 is rigidly held between the end frames 1 and 2 and the part 14 is adjustably held therebetween, by the shouldered bolts 3, 4 and 5.

The roller bearing units 15 and 16, are the positioning or guide elements of the bearing and are of similar construction as the load carrying unit 14, which is adjustable as a unit between the end frames 1 and 2, by the cams 47 and is clamped in position by the screws 18 and 19, which pinch the cam after the load carrying unit 14, is located in position, as clearly shown in Figure 1, by bringing together the split portions 20 and 21 of the end frames 1 and 2.

Figure 5:
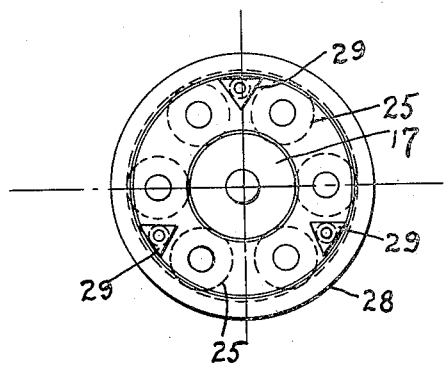
Figure 5, is an end elevation of the load carrying unit.
Figure 6:
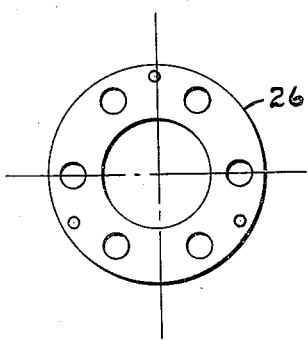
Figure 6, is a plan of one of the roller retainers.
Figure 7:
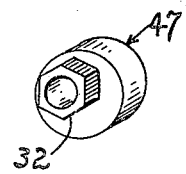
Figure 7, is an isometric view of one of the adjusting eccentrics.

Referring to Figures 4 and 5, the body 17, is comprised of a hardened rolling surface 20, a shouldered guide portion 21 and 22, and two outwardly projecting portions 23 and 24, which in the guiding units 15 and 16, enter into and engage with the end frames 1 and 2, and in the load carrying unit enter into engagement with the cam elements 47.

Engaging the rolling surface 20, are six hardened rollers 25, rolling between and guided by the shouldered portions 21 and 22, all of which are held in spaced relation between the two retaining parts 26 and 27, by the shouldered spacing studs 28 and washers 29 and 30.

Each of the rollers 25, projects beyond the retaining parts 26 and 27, and engages a hardened casing 28, and is held positioned by the inwardly projecting portions 36 and 37, which are integral with the said casing.

The hardened casings 28, engage the shaft 31, and the part 14, adjusted to suit conditions by turning the eccentric 47, by means of the nut shaped extension 32.

The vertical centerline 35 of the load carrying unit 14, is somewhat offset from the vertical centerline of the shaft 31, with the object in view of utilizing the power of gravitation as a driving force, as clearly shown in Figures 1 and 3.

The arrows in Figure 3, show the direction of rotation of the hardened rollers and the shaft, wherein the shaft will roll upon the three casings and the casings will roll, each one, upon the hardened rollers therein and the rollers will roll upon the body which is fixed.

Having thus described the preferred embodiment of my invention, I do not wish to limit myself to the exact construction shown, since it is evident that modifications may be made without departing from the spirit of the invention or scope of the claims.

I claim:—

1. In a roller bearing, the combination of two end frames, slidable over a shaft, each provided with a holding means, said frames split at the upper portion and having means holding two fixed guide rollers comprised of a tubular sleeve with a plurality of rollers therein between the said sleeve and a fixed shaft and one eccentrically adjustable load carrying roller offset from the vertical center-line of said bearing, said adjustable roller for operating with said split portion provided with a locking means all of which rollers being in contact with said shaft and in spaced relation to each other and the said shaft.

2. The combination with a three point roller bearing, of two end frames carrying two fixed guiding units and one split to eccentrically, adjustably and lockably carry a load carrying unit, each unit comprising a multiple of hardened rollers rotatable within a tubular retaining means, means guiding the said rollers upon a fixed body, a hardened sleeve provided with roller guiding means and the said end frames split and provided with means for holding and positioning said eccentrically adjustable load carrying unit.

Signed at Amenia, in the county of Dutchess and State of New York, this 24 day of June, 1927.

WILLIAM D. BURNS.